Nov. 5, 1963 K. C. LINDER 3,109,987

IMPROVED INTEGRATOR

Filed Dec. 18, 1961 2 Sheets-Sheet 1

*INVENTOR.*
KENNETH C. LINDER
BY O. A. Gulbrandsen
ATTY.

Nov. 5, 1963 K. C. LINDER 3,109,987

IMPROVED INTEGRATOR

Filed Dec. 18, 1961 2 Sheets-Sheet 2

INVENTOR.
KENNETH C. LINDER

BY C. A. Gulbrandsen

ATTY.

3,109,987

IMPROVED INTEGRATOR

Kenneth C. Linder, Chicago, Ill., assignor to Automatic Electric Laboratories, Inc., Northlake, Ill., a corporation of Delaware Filed Dec. 18, 1961, Ser. No. 160,152

5 Claims. (Cl. 325—38)

This invention relates to communication systems and more particularly to exponential delta modulation communication systems.

Exponential delta modulation is a method of communications wherein the transmitted information is in the form of digital pulses. Only the presence or absence of a pulse has any significance in this system. For one way communication an encoder and a decoder are coupled by a highway along which the pulses are transmitted. The encoder is a device that changes a continuous voice signal which is an analog signal into a digital form for transmission.

This is accomplished as follows:

The output pulses are returned to the encoder input through an integrating device which reconverts the digital pulses to a continuous or analog signal. This approximation is then compared to the input audio signal, and an error signal is generated. If the error signal is present (approximation greater than audio) a pulse is transmitted to the highway when a timing clock pulse comes along. Conversely, if the approximation is less than the audio when a clock pulse comes along, no pulse is sent out.

The decoder at the other end of the transmission highway has an integrating device identical to the integrating device in the feedback loop of the encoder. It accepts the digital information and converts this to an approximation of the audio wave form The encoder and decoder involve an analog to digital or digital to analog converting means and are referred to here and after as analog/digital converting means.

The integrating device may consist of a simple RC network driven by a bistable multivibrator. The multivibrator is changed from one state to another by the received pulses. The RC network builds an approximation by charging or discharging in accordance with the two level switching voltage impressed at the input. In some other exponential delta modulation systems the RC network is driven not by switching levels, but by the impulses themselves. In any case all of the schemes employed supply energy to the integrating network in discrete amounts and at the proper time.

The voltage swing of the multivibrator in the usual system of this type must be great enough for a given integrator RC time constant to allow approximation of the highest desired frequencies. Since this voltage swing is so large and the multivibrator responds equally to low frequencies and to high frequencies, the low frequencies are approximated by many short exponentials as many as one for each sampling pulse.

The overall effect is a close approximation of the highest desired frequencies but a poor approximation of lower frequencies. Because the low frequencies are reproduced by many short choppy pulses, much noise and distortion is introduced. This noise and distortion is objectionable and limits the future development of exponential delta modulation systems.

Accordingly it is an object of this invention to provide an integrator for this type of communication system which closely approximates all of the desired frequencies and increases the signal to noise ratio above that possible with present systems.

A feature of this invention is the use of a feedback loop with the RC integrator network including a differentiator which provides an output proportional to the slope of the approximated signal. The voltage derived from this loop is used in conjunction with the multivibrator voltage to drive the integrator.

The objects and features of this invention will become clear and other embodiments will become apparent upon reference to the following description and drawings in which.

According to the principles of this invention a waveform may be more accurately approximated in an exponential delta modulation system by varying or modifying the energy supplied to the integrator according to the slope of the waveform to be constructed. In this way the integrator can be made to respond more actively to large signals of high audio frequency and more passively to small signals having low audio frequency.

Figure 1:
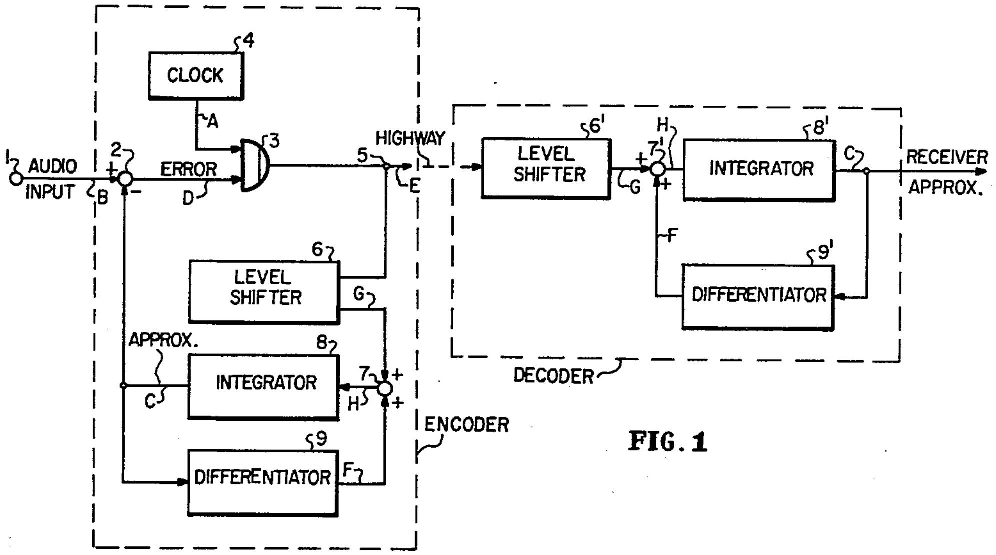
FIG. 1 is a schematic of an embodiment of this invention in an exponential delta modulation system including an encoder, a transmission medium and a decoder.

A schematic representation of an encoder using the principles of this invention is shown in left hand portion of FIG. 1 which includes an audio signal input 1, a comparison circuit 2, an AND gate 3, a souce of timed pulses 4, pulse output 5, a level shifter 6, which may be a bistable multivibrator, an adding circuit 7, an integrator 8, and a differentiator 9.

Both the audio input signal and the approximated audio signal are applied to the comparison circuit 2. If the audio input is different in amplitude than the approximated audio an error pulse which may be proportional to the difference of the two signals appears at the output of the comparison circuit and is applied to the AND gate 3. If an error pulse exists at the input to the AND gate 3 when a clock pulse occurs, an output pulse may be transmitted to output point 5 and to the level shifter input. The pulse at the output point 5 may continue along a highway (not shown) to a remote decoder (not shown). The pulse applied to the level shifter 6, may cause it to shift to a higher or lower voltage depending upon the amplitude and sense of the error pulse applied to it. This voltage level is added to a voltage produced by the differentiator 9. The differentiator voltage is proportional to the slope of the approximated audio input signal. The voltage applied to the integrator 8, by the adding circuit 7, may be proportional to the sum of the level shifter voltage output and the differentiator voltage output. The approximate audio frequency signal produced by the integrator 8 is applied to both the comparison circuit 2, and to the differentiator 9. This approximate audio signal is differentiated by 9 which produces a voltage output proportional to the amplitude and frequency of the approximate audio signal.

By adding the above described feedback loop including differentiator 9, and adding circuit 7 and by using a level shifter separate from the integrator it is possible to more accurately approximate the audio input signal.

Thus, for a given integrator RC time constant and a maximum desired frequency, a certain minimum voltage swing is required at the integrator input to satisfactorily approximate the highest desired frequencies. This voltage swing has previously been fixed for all frequencies to be approximated. This caused lower frequencies to be very roughly approximated. The present invention eliminates this problem by providing an infinite number of voltage levels between that level required for the highest desired frequencies and the level required for good approximation of the lowest desired frequencies.

FIG. 1 also shows a transmission medium or highway linking the encoder and decoder thus forming a system. It will be readily understood that the decoder functions in a manner described for the encoder except that the combining means 2, gate 3, and clock 4 are not required in the case of the decoder.

Figure 2:
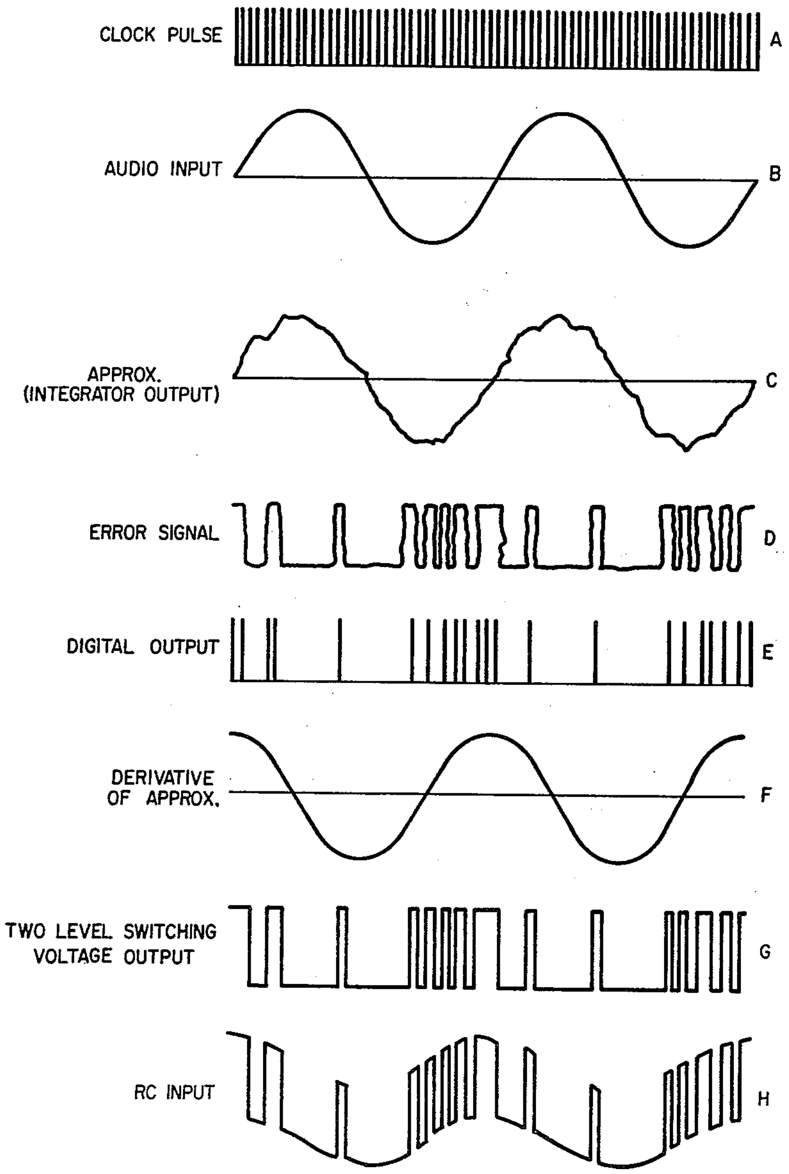
FIG. 2 is a graphical representation of the signal waveforms that appear at various points of the embodiments depicted in FIG. 1.

FIG. 2 includes a group of curves which represent the signal levels at various points throughout the encoder or decoder shown in FIG. 1.

While I have described above the principles of my invention in connection with specific apparatus, it is to be clearly understood that this description is made only by way of example and not as a limitation to the scope of my invention.

What is claimed is:

1. A delta modulation system comprising a transmission medium and analog/digital converting means connected to said medium, said converting means including,
 integrating means,
 circuit connections between said medium and the input of said integrating means for injecting digital pulses from said medium to the input of said integrating means whereby an approximated analog signal is derived from the output of said integrating means,
 and an energy varying means having its input connected to the output of said integrating means;
 said circuit connections including means having an input connected to the output of said energy varying means for varying the energy supplied to said integrating means under the control of said approximated signal.

2. A system as claimed in claim 1 wherein said energy varying means comprises means for varying the energy supplied to the input of said integrating means in accordance with the slope of the approximated signal appearing at the output of said integrating means.

3. A system as claimed in claim 1 wherein the output voltage of said energy varying means is proportional to the slope of said approximated signal.

4. An exponential delta modulation system comprising a transmission medium, an analog/digital encoder connected to said medium, said encoder including
 an analog input signal,
 an integrating means,
 means for combining said analog input signal with the output of said integrating means for producing an error signal,
 a source of timed pulses,
 gating means connected in its input side to said source and to the output of said combining means and on its output side to said transmission medium,
 whereby said error signal is transmitted along said medium in the form of digital pulses,
 circuit connections between said medium and the input of said integrating means for injecting digital pulses from said medium to the input of said integrating means whereby an approximated analog signal is derived from the output of said integrating means,
 and an energy varying means having its input connected to the output of said integrating means,
 said circuit connections including level shifting means and adder means,
 said level shifting means connected to the input of said adder means,
 said adder means having another input connected to the output of said energy varying means for varying the energy supplied to said integrating means under the control of said approximated analog signal.

5. In an exponential delta modulation system comprising a transmission medium, an analog/digital decoder connected to said medium, said decoder including
 a digital input signal,
 an integrating means,
 circuit connections between said medium and the input of said integrating means for injecting digital pulses from said medium to the input of said integrating means whereby an approximated analog signal is derived from the output of said integrating means,
 and an energy varying means having its input connected to the output of said integrating means, said circuit connections including level shifting means and adder means,
 said level shifting means connected to the input of said adder means,
 said adder means having another input connected to the output of said energy varying means for varying the energy supplied to said integrating means under the control of said approximated analog signal.

References Cited in the file of this patent

FOREIGN PATENTS 843,818 Great Britain ---------- Aug. 10, 1960